United States Patent
Lin et al.

(10) Patent No.: US 10,429,537 B2
(45) Date of Patent: Oct. 1, 2019

(54) EFFICIENCY OF PIXEL-BASED INVERSION ALGORITHMS

(71) Applicant: Schlumberger Technology Corporation, Sugar Land, TX (US)

(72) Inventors: Yun Lin, Cambridge, MA (US); Aria Abubakar, Sugar Land, TX (US); Tarek M. Habashy, Burlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 708 days.

(21) Appl. No.: 14/372,739

(22) PCT Filed: Jan. 25, 2013

(86) PCT No.: PCT/US2013/023108
§ 371 (c)(1),
(2) Date: Jul. 16, 2014

(87) PCT Pub. No.: WO2013/116099
PCT Pub. Date: Aug. 8, 2013

(65) Prior Publication Data
US 2014/0350859 A1    Nov. 27, 2014

Related U.S. Application Data

(60) Provisional application No. 61/592,376, filed on Jan. 30, 2012.

(51) Int. Cl.
G01V 3/26    (2006.01)
G01V 3/38    (2006.01)
E21B 49/00   (2006.01)

(52) U.S. Cl.
CPC .............. *G01V 3/38* (2013.01); *E21B 49/003* (2013.01); *G01V 3/26* (2013.01)

(58) Field of Classification Search
CPC ........... G01V 3/26; G01V 3/38; E21B 49/003
See application file for complete search history.

(56) References Cited

U.S. PATENT DOCUMENTS 5,394,325 A * 2/1995 Schneider, Jr. .......... G01V 1/28
                                                    702/18
6,067,340 A * 5/2000 Eppstein ............... G06T 11/006
                                                    378/4

(Continued)

FOREIGN PATENT DOCUMENTS

WO    2010/132432 A2    11/2010

OTHER PUBLICATIONS

Commer et al., Three-dimensional controlled-source electromagneticand magnetotelluric joint inversion, Geophys. J. Int. (2009) 178, 1305-1316.*

(Continued)

*Primary Examiner* — Janet L Suglo
*Assistant Examiner* — Liam R Casey

(57) ABSTRACT

A method of estimating formation parameters in a directional drilling process by acquiring electromagnetic logging while drilling (LWD) measurements over a non-uniform forward modeling grid and inverting, using a pixel-based inversion method, the LWD measurements over a uniform inversion grid. The inversion algorithm may be applied using a sliding window scheme that allows the formation parameters to be estimated independently and in parallel across a plurality of overlapping windows which span the entirety of the inversion grid.

19 Claims, 7 Drawing Sheets

(56) References Cited

U.S. PATENT DOCUMENTS

| | | | |
|---|---|---|---|
| 6,205,353 | B1 | 3/2001 | Alfano et al. |
| 6,739,165 | B1 | 5/2004 | Strack |
| 7,254,091 | B1* | 8/2007 | Gunning .............. G01V 11/00 367/73 |
| 7,640,110 | B2 | 12/2009 | Abubakar et al. |
| 8,571,287 | B2* | 10/2013 | Deman .............. G01N 23/046 382/131 |
| 2004/0113609 | A1* | 6/2004 | Homan .............. G01V 13/00 324/202 |
| 2007/0039776 | A1* | 2/2007 | Clark .............. G01V 1/3808 181/110 |
| 2007/0265815 | A1* | 11/2007 | Couet .............. G01V 11/00 703/10 |
| 2009/0006053 | A1* | 1/2009 | Carazzone .............. G01V 3/12 703/5 |
| 2009/0018775 | A1* | 1/2009 | Tabarovsky .............. G01V 3/28 702/9 |
| 2009/0102485 | A1 | 4/2009 | Wang et al. |
| 2009/0120634 | A1* | 5/2009 | Liu .............. G01V 1/303 166/250.01 |
| 2009/0204327 | A1 | 8/2009 | Lu et al. |
| 2010/0117655 | A1* | 5/2010 | Bittar .............. G01V 3/28 324/337 |
| 2010/0185393 | A1 | 7/2010 | Liang et al. |
| 2011/0051553 | A1 | 3/2011 | Scott et al. |
| 2011/0134722 | A1* | 6/2011 | Virgilio .............. G01V 1/30 367/75 |
| 2012/0310613 | A1* | 12/2012 | Moos .............. E21B 43/26 703/10 |

OTHER PUBLICATIONS

Hue et al., FDTD Simulation of MWD Electromagnetic Tools in Large-Contrast Geophysical Formations, IEEE Transactions on Magnetics, vol. 40, No. 2, Mar. 2004, pp. 1456-1459 (Year: 2004).*

Abubakar, et al., "A three-dimensional multiplicative-regularized non-linear inversion algorithm for cross-well electro-magnetic and controlled-source electromagnetic applications", Jan. 1, 2008, SEG Las Vegas Annual Meeting, pp. 584-588.

Ulugergerli, "Two dimensional combined inversion of short-and long-normal dc resistivity well log data", Aug. 8, 2010, Elsevier, Amsterdam, NL, Journal of Applied Geophysics, vol. 73, No. 2, pp. 130-138.

Li, et al., "A compressed implicit Jacobian scheme for 3D electro-magnetic data inversion", May 1, 2011, Society of Exploration Geophysicists, Geophysics, vol. 76, No. 3, 11 pages.

European Search Report issued in related EP application 13742984.1 dated Aug. 13, 2015, 5 pages.

Office Action issued in related EP application 13742984.1 dated Aug. 13, 2015, 4 pages.

Davydycheva et al., Review of 3D EM Modeling and Interpretation Methods for Triaxial Induction and Propagation Resistivity Well Logging Tools, PIERS Proceedings, Cambridge, USA, Jul. 5-8, 2010, pp. 390-396.

Habashy et al., A General Framework for Constraint Minimization for the Inversion of Electromagnetic Measurements, Progress in Electromagnetics Research, PIER 46, pp. 265-312, 2004.

Omeragic et al,. Directional Electromagnetic Measurements for Optimal Well Placement, SPE 97045, SPE Annual Technical Conference and Exhibition, Dallas, Texas, USA, Oct. 9-12, 2005, 12 pages.

Omeragic et al,. 3D Reservoir characterization and well placement in complex scenarios using LWD directional EM measurements, Petrophysics, vol. 50, No. 5, 396-415, 2009.

International Search Report and Written Opinion issued in International Patent application PCT/US2013/023108 dated May 14, 2013, 16 pages.

International Preliminary Report on Patentability issued in International Patent application PCT/US2013/023108, dated Aug. 5, 2014, 4 pages.

* cited by examiner

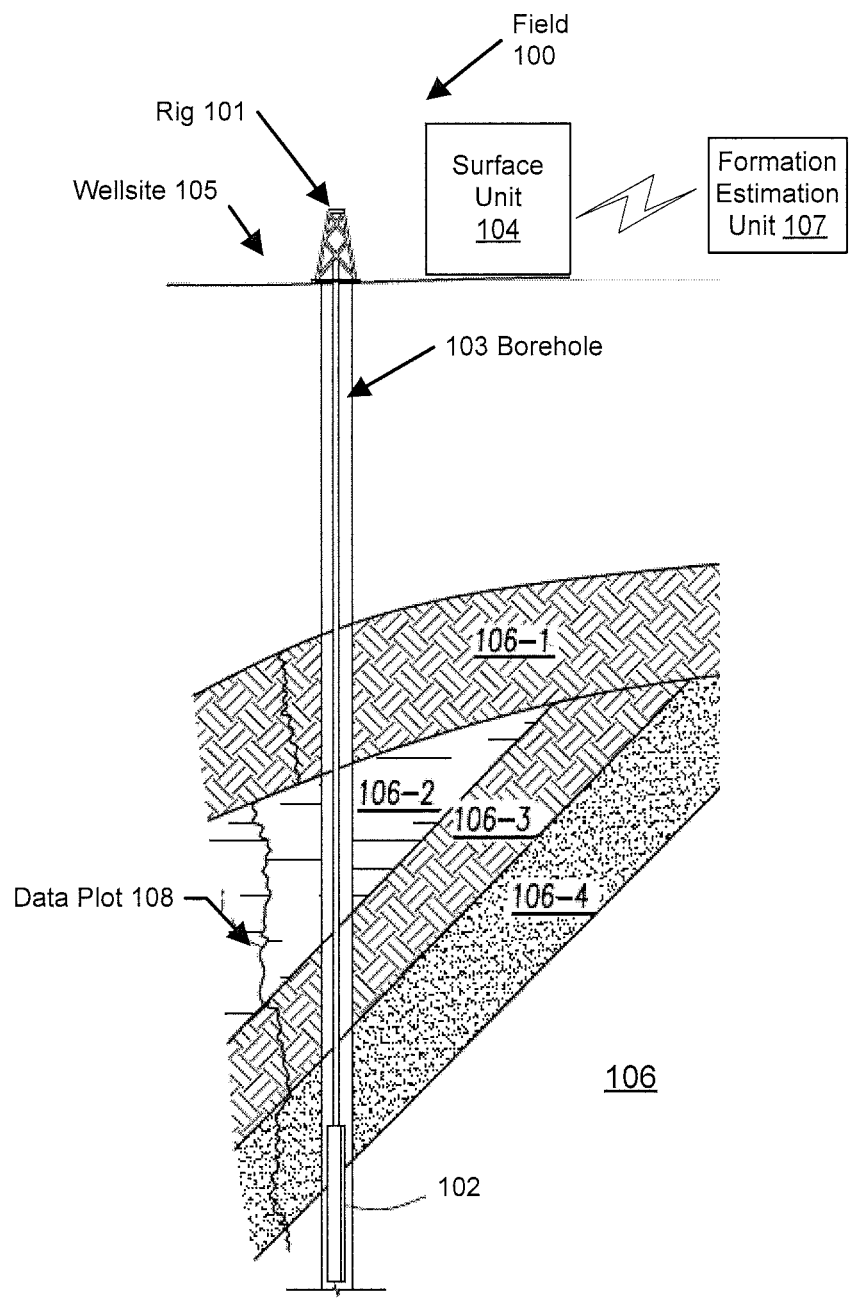
FIG. 1.1
(Prior Art)

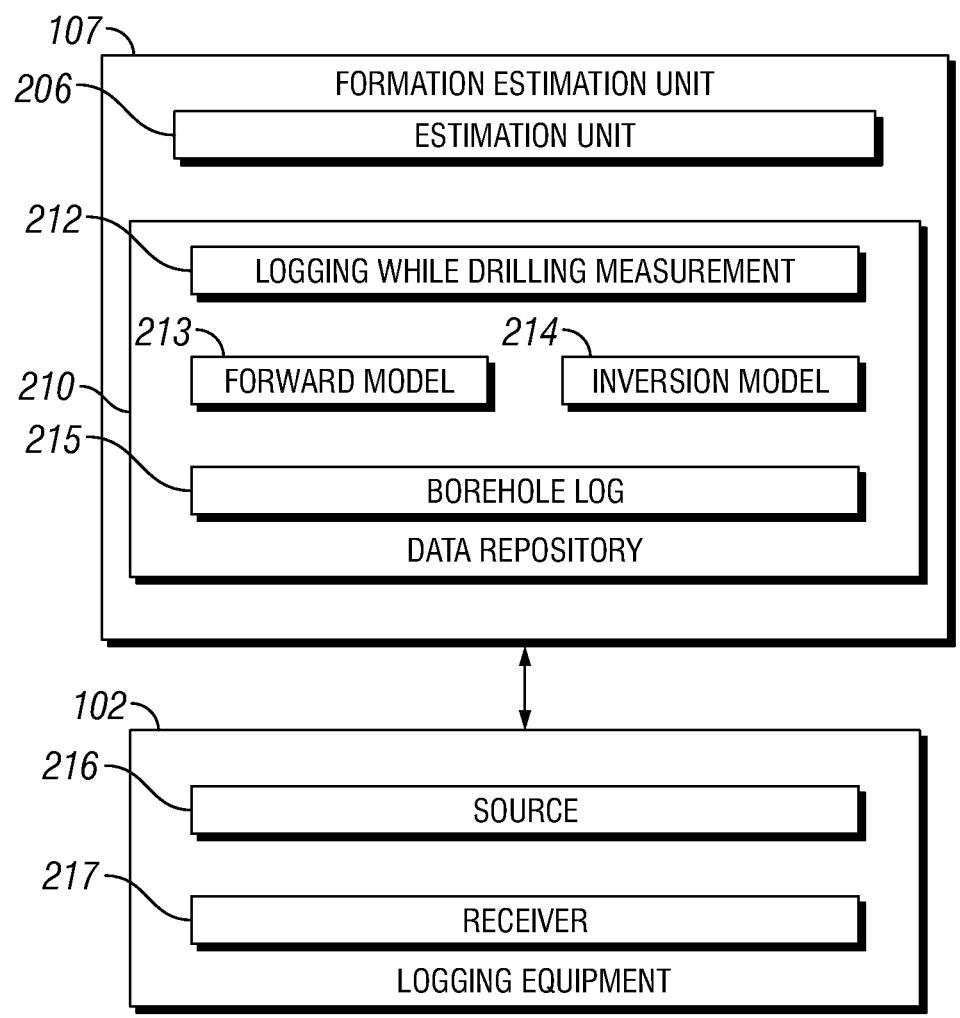
FIG. 1.2

EFFICIENCY OF PIXEL-BASED INVERSION ALGORITHMS

PRIORITY

This application claims priority to U.S. Provisional Patent Application Ser. No. 61/592,376 with the same title filed on Jan. 30, 2012. The application is incorporated by reference herein.

FIELD OF THE DISCLOSURE

Embodiments disclosed herein relate generally to estimation of formation parameters and more specifically, estimation of formation parameters by way of an inversion method of electromagnetic logging while drilling (LWD) measurements.

BACKGROUND

Operations, such as geophysical surveying, drilling, logging, well completion, hydraulic fracturing, steam injection, and production, are typically performed to locate and gather valuable subterranean assets, such as valuable fluids or minerals. The subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting them into subterranean structures using boreholes and the operations associated with this process. Further, the term "field operation" refers to a field operation associated with a field, including activities related to field planning, wellbore drilling, wellbore completion, and/or production using the wellbore (also referred to as borehole).

SUMMARY

In general, in one aspect, embodiments related to a method for estimating a formation parameter of a geologic formation surrounding a borehole, the method including estimating the formation parameter on a uniform inversion grid by applying a pixel-based inversion algorithm to a plurality of logging while drilling (LWD) measurements on a non-uniform forward modeling grid and displaying the formation parameter as a spatial distribution of a survey area.

In general, in one aspect, embodiments related to a system for estimating a formation parameter of a geologic formation surrounding a borehole, the system including a logging while drilling (LWD) tool having a source and a receiver, an acquisition unit configured to acquire LWD measurements from a LWD tool, and an estimation unit configured to estimate the formation parameter on a uniform inversion grid by applying a pixel-based inversion algorithm to the plurality of LWD measurements on a non-uniform forward modeling grid.

This summary is provided to introduce a selection of concepts that are further described below in the detailed description. This summary is not intended to identify key or essential features of the claimed subject matter, nor is it intended to be used as an aid in limiting the scope of the claimed subject matter. Other aspects and advantages of the invention will be apparent from the following description and the appended claims.

BRIEF DESCRIPTION OF DRAWINGS

The appended drawings illustrate several embodiments of improving efficiency of pixel-based inversion and are not to be considered limiting of its scope, for improving efficiency of pixel-based inversion may admit to other equally effective embodiments.

FIG. 1.1 is a schematic view of a wellsite depicting a data logging operation in which one or more embodiments of pixel-based inversion may be implemented.

FIG. 1.2 is a schematic diagram of a system used in pixel-based inversion in accordance with one or more embodiments.

DETAILED DESCRIPTION

Figure 2:
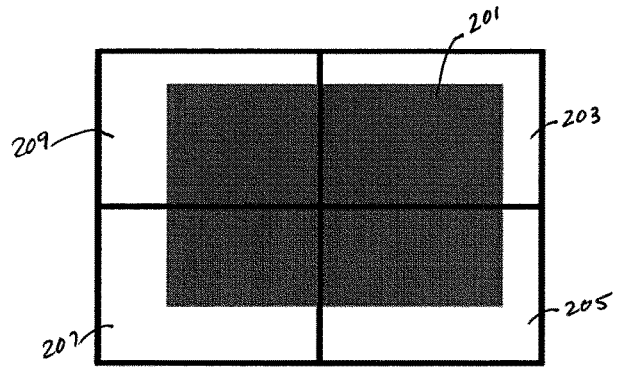
FIG. 2 shows an example of an inversion pixel and four forward pixels.

When drilling a well, various logging tools and sensors are used to measure properties of the formations surrounding the borehole in order to obtain data for use in formation evaluation, geosteering, and well characterization, among many others. Data may be acquired and processed in real time (i.e., during the drilling of a well) or data may be acquired and stored in the tool's memory for analysis or processing at a later time. The data may be processed or analyzed at a location other than the well site.

One technique used in the field, known as logging while drilling (LWD), may be used to measure a variety of properties of the borehole and its surrounding formations. Properties such as porosity, resistivity, pressure, and velocity may be of interest during LWD as well as during wireline logging. One skilled in the art would know and appreciate that the measurements obtained from the LWD (or wireline logging) technique are not limited to the aforementioned properties and may be used to measure many other properties known in the art.

In LWD (or wireline logging), one or more sources and one or more receivers are placed in the well borehole. The one or more sources may be electromagnetic sources, acoustic sources, or any other sources known in the art. The one or more receivers may receive electromagnetic signals, acoustic signals, or any other signals known in the art. The signals generated by an electromagnetic source may be electromagnetic fields. Electromagnetic fields are sensitive to the resistivity distribution of the surrounding subsurface (i.e., geologic formation) around the borehole.

Electromagnetic fields generated by the one or more sources propagate into the surrounding region. The propagated electromagnetic fields are eventually detected by the one or more receivers. Through an inversion algorithm, the measured electromagnetic fields can be converted to the resistivity distribution of the subsurface.

In the inversion method, LWD (or wireline logging) is performed to produce resistivity logs. Also, an approximate or estimated model of the formation is made. This model of the formation essentially comprises a "guess" as to the characteristics of the formation. After the model of the formation is generated, a computer model of the tool is used to transform the model formation into a simulated log response. This simulated log response is then compared with the actual log data. One or more parameters of the model formation are then adjusted based on this comparison of the simulated log response to the actual log data, a new comparison is made, and the above process repeats. Thus the inversion algorithm iteratively refines the model formation until the simulated log matches the actual log.

The term "inversion" is used because the problem of correcting the logs is the "inverse" of the mathematical model that computes a log response from a model formation. The computer routine that simulates the response of the tool is referred to as the "forward model." Inversion is generally slower than deconvolution techniques. However, inversion is better suited to nonlinear problems.

Inversion methods are computationally intensive. The forward model attempts to capture the physics of the problem, subject to the simplifying assumptions which may have been applied. The forward model may take the form of a Born series, a propagated geometric factor, or a solution of Maxwell's Equations.

Inversion algorithms may be broadly categorized, depending on the representation of the model parameters, into two types: pixel-based inversion and model-based inversion. The pixel based inversion divides the inversion domain into small pixels and the value of the unknown inside one pixel is assumed to be a constant. The inversion procedure is used to obtain the unknown value of each pixel. On the other hand the model-based inversion uses some a priori information about the unknown configuration and then in the inversion the parameters associated with that model are inverted. Hence, the pixel-based inversion may use a minimum amount of prior knowledge of the borehole and the surrounding formation. However, the pixel-based inversion is computationally strenuous, and therefore expensive, as it uses a large number of model parameters in order to describe the formation model.

The number of model parameters used in pixel-based inversion is approximately the same as the number of discretization grids employed to describe the formation model. Discretization grids are the discrete subsections into which the survey area is separated. In electromagnetic LWD (or wireline logging) measurements where the distances between sources and receivers are short with respect to a large survey domain, the use of fine spatial discretization grids in the forward modeling algorithm may be used. The forward modeling algorithm is a finite-difference frequency-domain method. It is used to generate simulated response for a given model by numerically solving the Maxwell's equations. If employing the same grid for inversion, the fine spatial discretization grids together with the large survey domain results in a large number of unknown parameters. The large number of unknown parameters causes the determination of the inverse to be computationally strenuous and therefore, costly.

In LWD applications, one-dimensional (1D) inversion can be computationally efficient but may result in biased inversion results when violation of the 1D model assumption occurs. On the other hand, the full three-dimensional (3D) inversion is very expensive for the reasons described above. The two-dimensional (2D) inversion may provide a good balance between computational cost and flexibility and thus, employing 2D inversion using 3D sources, in accordance with embodiments of the present disclosure, may efficiently and accurately estimate the formation parameters in electromagnetic LWD (or wireline logging) applications.

In one or more embodiments, the forward modeling grid is separate and decoupled from the inversion grid. By doing this, different grid sizes (i.e., grid spacing) may be used for the forward and inversion problems. An adaptive grid may be selected such that the size of each of the cells in the grid is determined by the sensitivity of the data within each cell and therefore, the grid may not be uniform. When using an adaptive grid, areas of concern or interest may be the focus. The density of the adaptive grid can be designed so that the area of interest has denser grid (which may help us obtain inversion results with a better resolution), and the other areas to have coarser grids.

An adaptive grid may be employed for the forward modeling algorithm. Where the distance between sources and receivers are short, the forward modeling grids near source-receiver regions (i.e. near-field) need to be fine enough in order to simulate the electromagnetic fields accurately. As for regions far away from sources and receivers (i.e. far-field), coarser forward modeling grids may be employed to provide sufficient accuracy of the electromagnetic fields.

Separate from the forward modeling grid, a grid with uniform grid spacing (near-field and far-field regions employ the same grid cell size) may be employed for the inversion. A combination of different forward and inversion grids may be used to make the pixel-based inversion algorithm computationally more efficient than using the same grid for both forward modeling and inversion. The resolution of the inversion grid may be chosen based on a measurement resolution, such as to have a maximum value of the resolution of data measurements on which the modeling and inversion is being performed. Further, the measurement resolution may be a function of the measuring device that is placed downhole (and taking measurements) during or prior to drilling. Specifically, the measurement resolution may be based on the receiver transmitter spacing for the particular device used and may be a function of frequency and average resistivity value.

FIG. 1.1 depicts a schematic view, partially in cross section, of a field 100 in which one or more embodiments of LWD and estimation of formation parameter from LWD measurements may be implemented. In one or more embodiments, one or more of the modules and elements shown in FIG. 1.1 may be omitted, repeated, and/or substituted. Accordingly, embodiments of the logging and analysis disclosed herein should not be considered limited to the specific arrangements of modules shown in FIG. 1.1.

As shown in FIG. 1.1, the subterranean formation 106 includes several geological structures. As shown, the formation has a sandstone layer 106-1, a limestone layer 106-2, a shale layer 106-3, and a sand layer 106-4. In one or more embodiments, various survey tools and/or data acquisition tools are adapted to measure the formation and detect the characteristics of the geological structures of the formation.

As shown in FIG. 1.1, the wellsite 105 includes a rig 101, a borehole 103, and other wellsite equipment and is configured to perform wellbore operations, such as logging, drilling, fracturing, production, or other applicable operations. Generally, these operations performed at the wellsite 105 are referred to as field operations of the field 100. These field operations are typically performed as directed by the surface unit 104.

In one or more embodiments, the surface unit 104 is operatively coupled to the wellsite 105. In one or more embodiments, surface unit 104 may be located at the wellsite 105 and/or remote locations. The surface unit 104 may be provided with computer facilities for receiving, storing, processing, and/or analyzing data from data acquisition tools (e.g., logging equipment 102) disposed in the borehole 103, or other part of the field 100. In one or more embodiments, the logging equipment 102 is installed on a bottom hole assembly (BHA) or a wireline in the borehole 103. The surface unit 104 may also be provided with functionally for actuating mechanisms at the field 100. The surface unit 104 may then send command signals to these actuating mechanisms of the field 100 in response to data received, for example to control and/or optimize various field operations described above, including, for example, geosteering.

As noted above, the surface unit 104 is configured to communicate with data acquisition tools (e.g., logging equipment 102) disposed throughout the field 100 and to receive data therefrom. In one or more embodiments, the data received by the surface unit 104 represents characteristics of the subterranean formation 106 and the borehole 103 and may include information related to porosity, saturation, permeability, stress magnitude and orientations, elastic properties, thermal properties, etc. These characteristics of the subterranean formation 106 and the borehole 103 are generally referred to as formation and/or borehole properties that are dependent on the type of rock material in various layers 106-1 through 106-4 of the subterranean formation 106; as well as the type of fluid within the borehole 103 and mechanical structures associated with the borehole 103. In one or more embodiments, the data may be received by the surface unit 104 during a drilling, fracturing, logging, injection, or production operation of the borehole 103. For example, data plot 108 may be a wireline log obtained during a wireline logging operation, logging-while-drilling (LWD) operation, or other types of logging operations. Generally, the data plot 108 is a measurement of a formation/borehole property as a function of depth taken by an electrically powered instrument to infer properties and make decisions about drilling and production operations.

In one or more embodiments, the surface unit 104 is communicatively coupled to a formation estimation unit 107. In one or more embodiments, the data received by the surface unit 104 may be sent to the formation estimation unit 107 for further analysis. In one or more embodiments, formation estimation unit 107 estimates formation parameter on a uniform inversion grid by applying a pixel-based inversion algorithm to the data received (i.e., a plurality of LWD measurements).

Typically, the field operations (e.g., logging, drilling, fracturing, injection, production, or other applicable operations) are performed according to a field operation plan that is established prior to the field operations. The field operation plan typically sets forth equipment, pressures, trajectories and/or other parameters that define the operations performed for the wellsite. The field operation may then be performed according to the field operation plan. However, as information is gathered, the field operation may deviate from the field operation plan. Additionally, as drilling, fracturing, injection, EOR, or other operations are performed, the subsurface conditions may change. An earth model may also be adjusted as new information is collected. Such information may include results generated by the formation estimation unit 107 that is used to identify appropriate changes to the field operation plan to address a new found event. For example, the direction of the well trajectory may be adjusted based on the formation resistivity estimated by the formation estimation unit 107.

As shown in FIG. 1.2, in one or more embodiments, the formation estimation unit 107 may be in communication with the logging equipment 102. The logging equipment comprises at least one source 216 and at least one receiver 217. The formation estimation unit 107 may comprise an estimation unit 206 and a data repository 210. The data repository 210 may comprise measurements obtained from logging while drilling 212, the borehole log 215, the forward model 213, and the inversion model 214. The estimation unit 206 may use data, measurements, or models from the data repository 210 to estimate one or more formation parameters.

Figure 3:
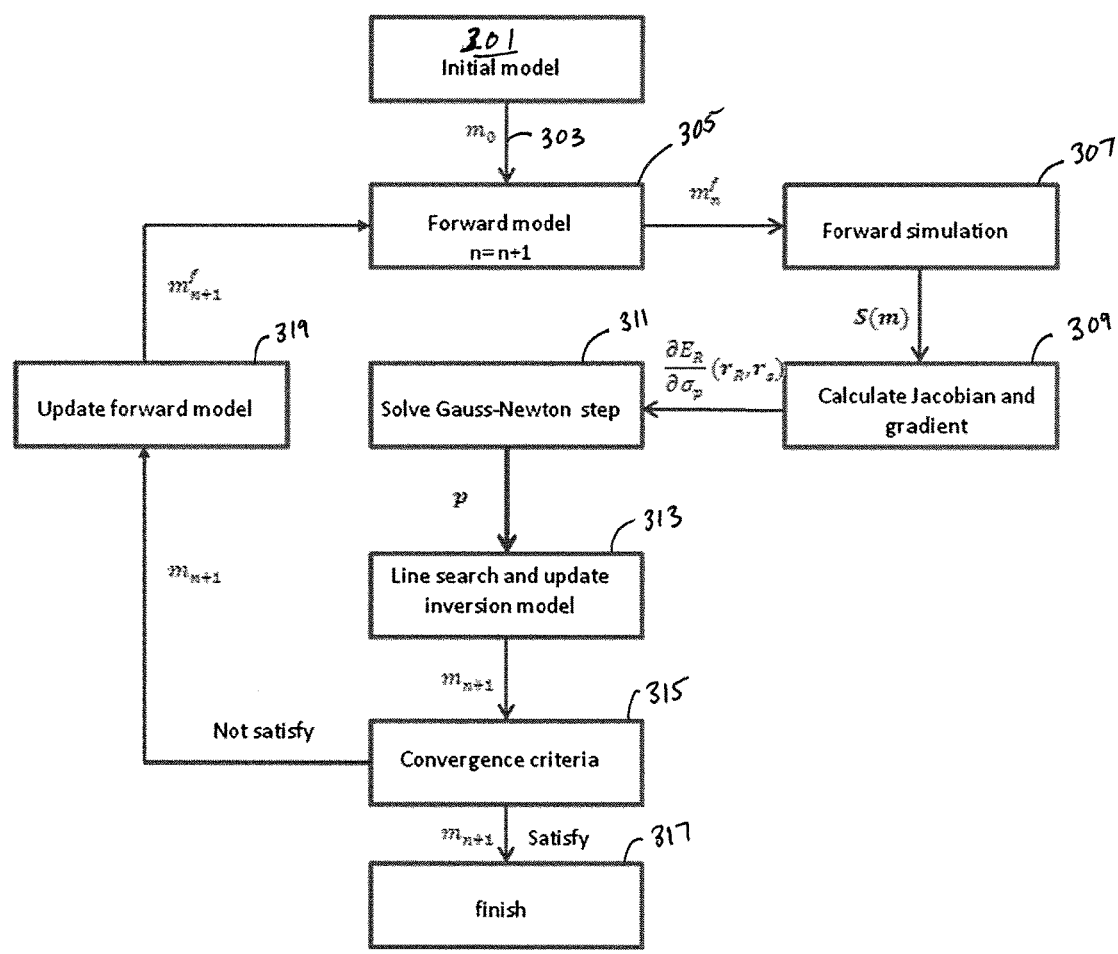
FIG. 3 is a flowchart describing the inversion workflow.

A flowchart describing the formation estimation through an inversion workflow is shown in FIG. 3. In one or more embodiments, one or more of the elements shown in FIG. 3 may be omitted, repeated, and/or performed in a different order. Accordingly, embodiments of pixel-based inversion should not be considered limited to the specific arrangements of elements shown in FIG. 3.

In step 301, an initial model is chosen as an initial guess for the model parameter lying within its physical bounds. The initial guess is transferred to the forward modeling grid at transition 303. In step 305, the forward model is initially set as the initial guess model. In step 307, forward model algorithm is run in order to generate to simulated data. In one or more embodiments, the forward modeling grid solves Maxwell's equation by employing a finite-difference frequency-domain method.

Specifically, the electromagnetic fields at the receiver locations for a given medium and for a source excitation can be computed by solving Maxwell's equation in the frequency-domain:

$$\nabla \times \nabla E - (i\omega\mu\sigma + \omega^2 \mu\varepsilon)E = \nabla \times K + i\omega\mu J$$

where E is the electric field, J is the electric current source, K is the magnetic current source, and where the parameters $\sigma$, $\mu$, and $\varepsilon$ are the conductivity, magnetic permeability, and permittivity, respectively. A finite-difference frequency-domain method may be employed to solve the Maxwell equation on the forward modeling grid. However, one of ordinary skill in the art would know that the method used to solve the Maxwell equation is not limited to a finite-difference frequency-domain method, but that any numerical analysis method may be used.

From the simulated data, a Jacobian matrix is calculated on the forward modeling grid using the adjoint method described above, step 309. The Jacobian matrix is then recomputed on an inversion grid using a linear interpolation scheme. In accordance with the present disclosure, the recomputation involves mapping a field distribution from the non-uniform forward modeling grid to the uniform inversion grid.

A particular entry in the Jacobian matrix is the derivative of the simulated data with respect to an inversion parameter. This entry can be used to determine the search direction in the inversion algorithm as described in Habashy and Abubakar (2004). The Jacobian matrix can be calculated using the adjoint method by taking the transpose of the cofactor matrix.

In the conventional algorithm, when employing the same grids for both forward modeling and inversion, the Jacobian matrix elements are given by, $$\frac{\partial H}{\partial \sigma_p}(r_R, r_S) = \int_{S_p} E(r, r_S) \cdot E(r, r_R) dV$$

where H($r_R$,$r_S$) is the simulated data at a receiver location $r_R$ due to a source at location $r_S$. $\sigma_p$ is the inversion parameter (i.e., conductivity) in the p th pixel. Conductivity is the inverse of resistivity (e.g, if the conductivity is 0.1 S/m, the) resistivity is 10 Ohm-m). The electric fields E(r,$r_S$) and E(r,$r_R$) are computed at the location r due to sources located at $r_S$ or $r_R$ respectively.

In one or more embodiments, forward modeling grids that are different from the inversion grids may be used. That is, the forward modeling grid may be non-uniform while the inversion grid is uniform. In this case, the electric field may have different values at different locations inside a single inversion grid cell (pixel) as the forward modeling pixel may overlap several inversion pixels or vice versa. Hence, the integration in the above equation may be replaced by a summation of several integrations on small areas where the electric field is constant. FIG. 2 shows an example of an inversion pixel 201 and four forward pixels 203, 205, 207, and 209. Thus, the above equation may be replaced by:

$$\frac{\partial H}{\partial \sigma_p}(r_R, r_S) = \sum_{k=1}^{K} \int_{S_k} E(r, r_S) \cdot E(r, r_R) dV$$

where K is the number of forward modeling pixels that overlap with the p-th inversion pixel. $S_k$ is the area of the k-th forward pixel overlapping with the p-th inversion pixel.

To assess a resistivity distribution for a given formation, in one or more embodiments, the inversion modeling may be performed to find an unknown model parameter vector m (corresponding to the resistivity distribution) that satisfies:

$d=S(m)$ where d stands for the vector of the measured data containing the measured electric and/or magnetic field, S stands for the vector of the simulated data for a given model parameter vector m. This problem is solved as a minimization of the multiplicative cost function:

$C(m)=\Phi^d(m)\times\Phi^R(m)$ where the first factor is the data misfit and the second factor is the regularization cost function.

In one or more embodiments, the above minimization problem is solved using a Gauss-Newton method. Referring back to FIG. 3, in step 311, the Gauss-Newton normal equation described below is used to compute the Gauss-Newton step vector.

The Gauss-Newton minimization approach has a rate of convergence which is less than quadratic but significantly better than linear. One skilled in the art would know that the solution to the above minimization problem is not limited to the Gauss-Newton method. Any other deterministic inversion method can be also employed.

Starting with an initial guess, the vector m is iteratively updated using the step vector P obtained by solving the following normal equation at the n-th iteration:

$H_n p_n = -g_n$ where H is the Hessian matrix and g is the gradient vector. The above equation in $p_n$ is solved using a conjugate gradient least-squares method.

Referring back to FIG. 3, after computing the Gauss-Newton step vector, the step length is found using the line-search algorithm which iteratively determines a local minimum and the model parameter vector is updated on the inversion grid, followed by mapping it on the forward grid in step 313.

Specifically, the model parameter vector can then be updated as follows:

$m_{n+1} = m_n + v_n p_n$ where v is a scalar representing the step length calculated from a line-search algorithm as described in Habashy and Abubakar (2004) to guarantee the decrease of the cost function. After updating the model parameter $m_{n+1}$, the model parameter is then mapped on the forward modeling grid in order to compute the simulated data. The mapped model on the forward modeling grid is given by $$m_{n+1;k} = \frac{1}{\sum_{j=1}^{P} S_j} \sum_{p=1}^{P} S_p m_{n+1;p}$$

where there are P inversion grids overlapping with the k-th forward pixel. The area $S_p$ is the area of the p-th inversion pixel overlapping with the k-th forward pixel.

Referring back to FIG. 3, the updated inversion model is checked to see if any of the convergence criteria are satisfied in step 315. If any of the convergence criteria is satisfied, the inversion process is terminated and updated inversion model is used as the result in step 317. If none of the criterion are met, the updated inversion model is used as the forward model, step 319, in the next iteration and the inversion process begins again at step 305. Specifically, the inversion process may be terminated when any one of the following convergence criteria is satisfied: (1) the root mean square of the relative error reaches a prescribed value determined from estimates of noise in the data, (2) the differences between two successive iterates of the model parameters are within a prescribed tolerance factor of the current iterate, (3) the number of iterations exceeds a prescribed maximum, or (4) the difference between the cost function at two successive iterates of the model parameters is within a prescribed tolerance factor of the cost function at the current iterate.

EXAMPLE

The following example is used to show estimation results and how they compare with the true model in accordance with embodiments disclosed herein.

Figure 5:
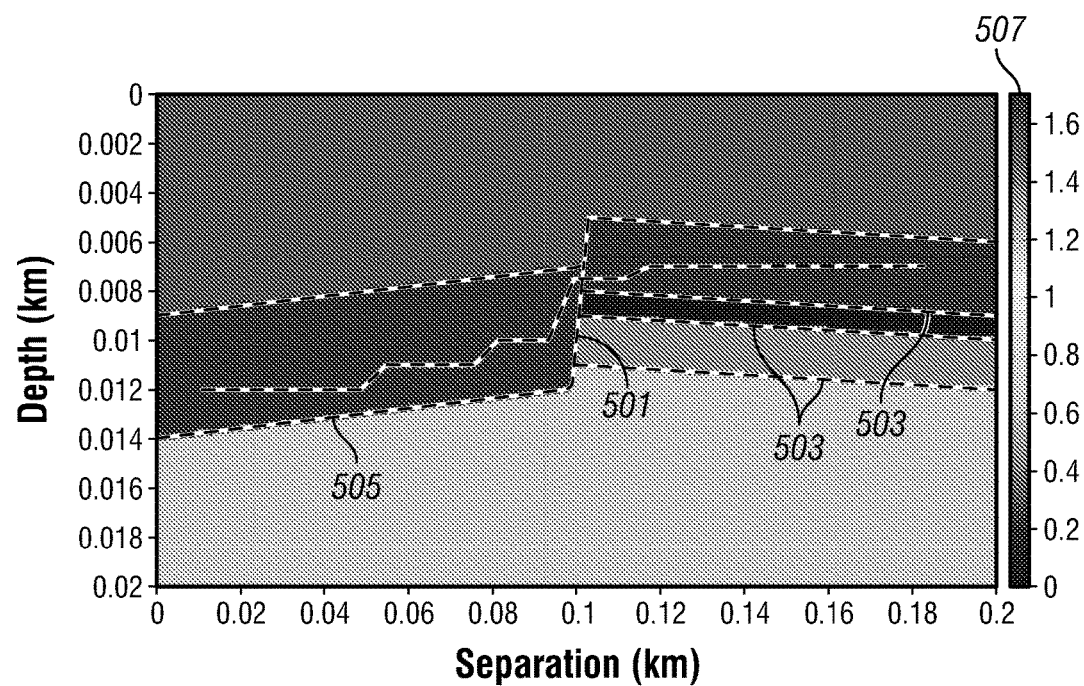
FIG. 5 is an example of a true model of a fault structure.

To demonstrate the workflow of FIG. 3, a synthetic example based on the Alaska North Slope field is used to show the true geologic model of the fault structure. The size of this example model is 200 m by 20 m. The model consists of a fault 501 and several dipping layers 503. The resistivity values for this example vary between 3 and 50 Ohm-m. The true resistivity model is shown in FIG. 5 and is represented in terms of the logarithm of the resistivity, shown in the scale 507. The dashed line 505 indicates the well trajectory.

Figure 6:
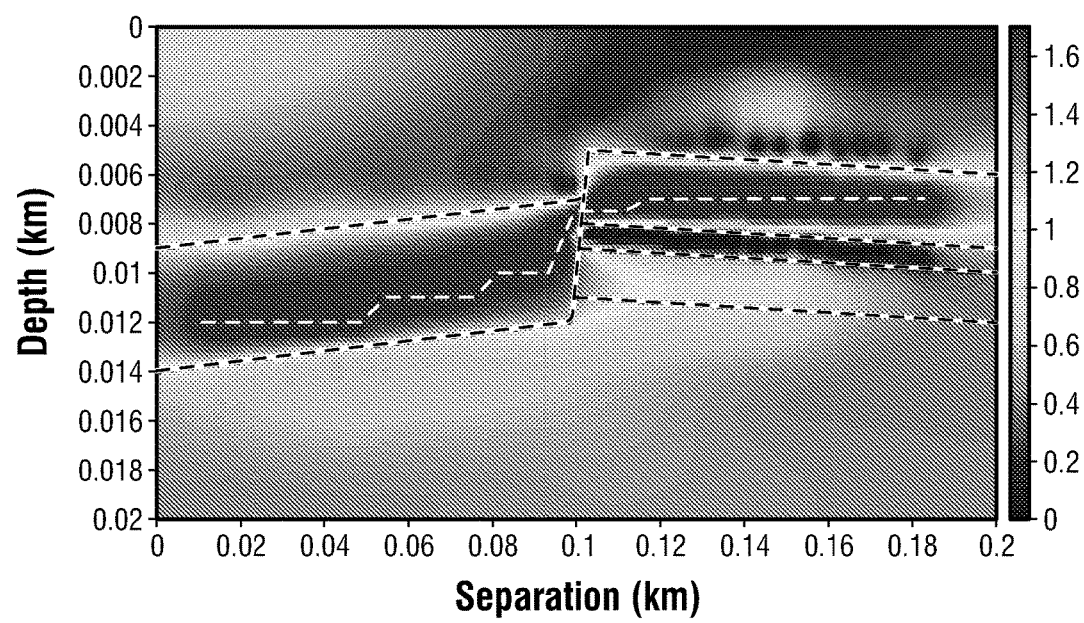
FIG. 6 is an example of an inverted model of the fault structure.

For comparison, inversion is performed using the conventional Gauss-Newton method where the same grid is used for both the forward modeling grid and the inversion grid is performed. In this example, the cell size used is 0.2 m by 0.2 m. As the example model is 200 m by 20 m, and using the aforementioned cell size, the number of unknowns is 100,000. As the conventional method uses the same grid for inversion and forward modeling, this is the same as the number of cells in the forward modeling grid. Using a total of 30 log points at 100 MHz and 400 MHz, the total number of data used is 1,560. A homogeneous initial model was employed. A homogeneous model consists of the same resistivity "guess" of the initial value for every grid cell in the model. The inversion result is shown in the FIG. 6. The computational time resulting from this example is about 150,479 seconds.

Figure 7:
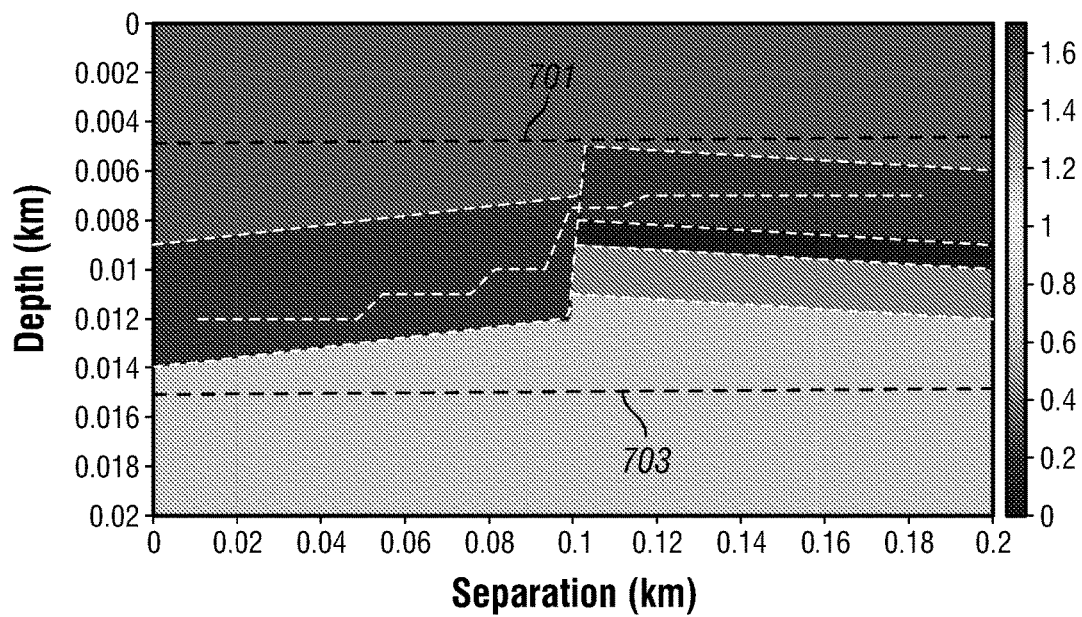
FIG. 7 is an example of employing non-uniform forward grids.
Figure 8:
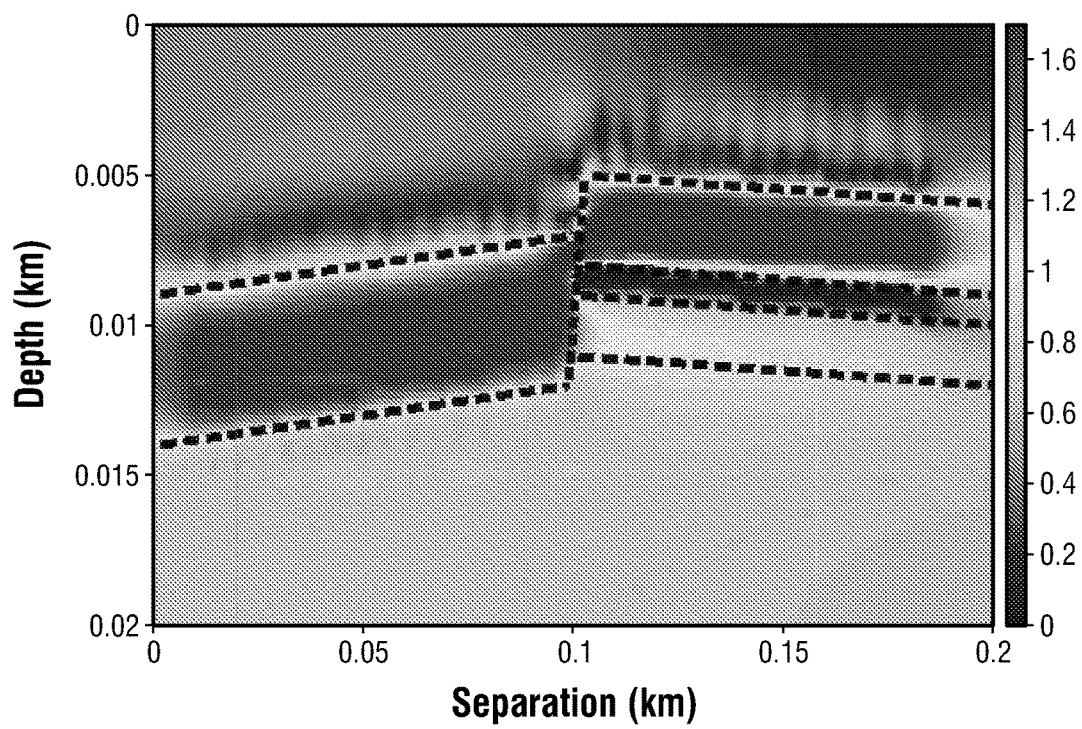
FIG. 8 is another example of an inverted model of the fault structure.

The example in FIG. 7 shows how the non-uniform forward grid is constructed. For regions near the wellbore, in this example between z=5 m and z=15 m (z being the axis indicating depth), line 701 and 703, respectively, finer spaced grids with the size of 0.2 m by 0.2 m are employed. For regions far from the wellbore, in this example z<5 m or z>15 m, coarser grids with the size of 0.2 m by 0.4 m are employed. Using the different sized grid cells for near and far regions with respect to the borehole, the number of the forward modeling grid cells is now 77,000, as opposed to 100,000 described in the above example. For the inversion grid, a uniform grid with size 0.2 m by 0.2 m is used when the inversion process is performed. In this case, the number of unknowns is the same as the above at 100,000, but the forward modeling grid only has 77,000 cells. The result of the inversion process in this example is shown in FIG. 8. Compared with the inversion results obtained by using the same grids for the forward modeling and inversion (FIG. 6), the results are very similar. However, in this example, due to the separate forward and inversion grid setup, the CPU-time for the forward simulation is reduced by 68%.

Figure 9:
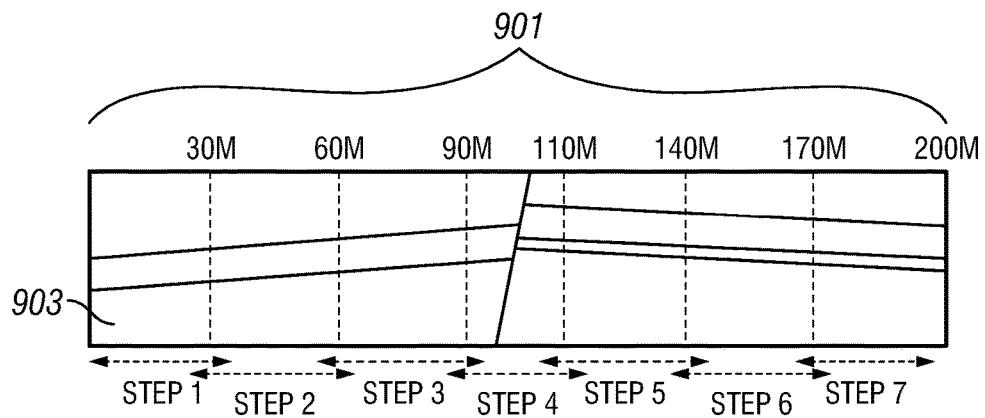
FIG. 9 is an example of an overlapping sliding window scheme.
Figure 10:
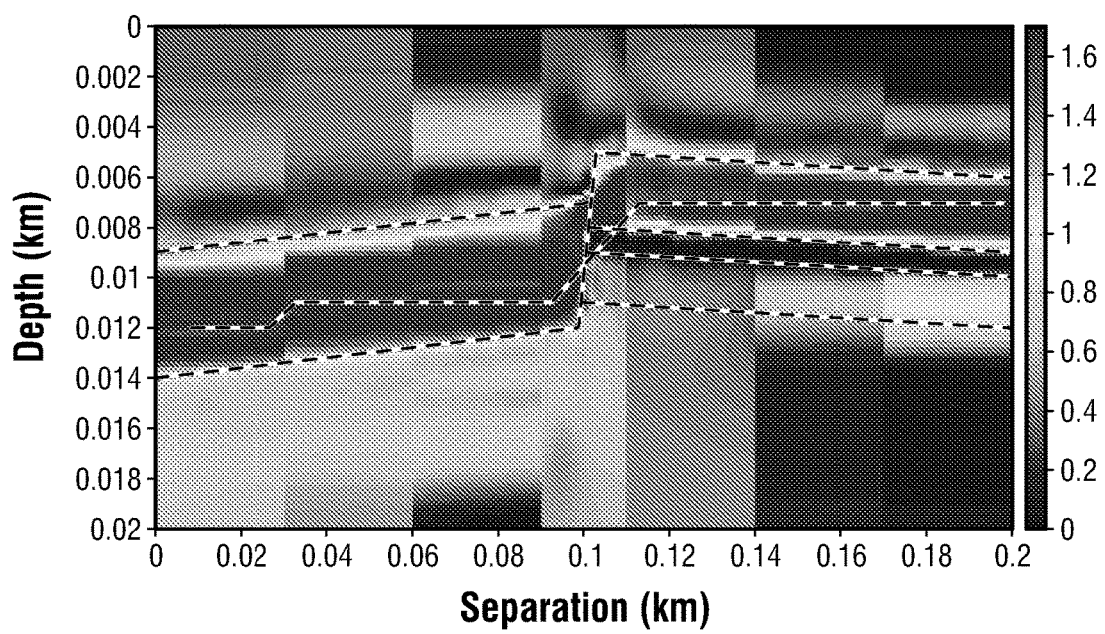
FIG. 10 is another example of an inverted model of the fault structure.

For the example shown in FIG. 9, an overlapped sliding window scheme is employed. In this example, the entire inversion domain 901 is divided into seven small inversion sub-domains, for example sub-domain 903. Each inversion window (or sub-domain), in this example, has a length of 50 m in the horizontal direction (except the fourth inversion window with a length of 40 m). The windows include overlap regions of length 20 m with the adjacent windows. One skilled in the art would know that the sub-domain lengths and overlap lengths may vary. The overlap region is employed to avoid discontinuities at the boundaries separating the inversion windows. The data in each inversion window includes 10 log points and results in the number of unknown parameters in each window being 25,000. A quick calculation shows that the number of unknowns over the seven sub-domains is 175,000, as opposed to 100,000 or 77,000 as described in the examples above. Using the same homogeneous initial model, inversion is performed on each window independently of each other. In this case, the inversion is also performed in parallel. After obtaining the inversion results for all the windows, the overlapping regions are discarded and the resulting inversion models from each window are merged together. The final inverted model is shown in FIG. 10. The computational time for inversion using the sliding window scheme is 13,527 seconds, which is nearly an order of magnitude less than the original example despite employing more data points, in this case, 75,000 more data points.

The use of parallel computing and a sliding window scheme in combination with the separate and decoupled inversion and forward modeling grids, the efficiency of the pixel-based inversion processed can be drastically increased.

The formation resistivity estimated using the inversion methods of the present disclosure may be displayed to a user and allow the user to determine where the direction of the well and ultimately, the well trajectory, during directional geosteering. Accordingly, the user may adjust the well plan (including, for example, drilling, well trajectory, completion operations, etc.) in real-time or at a subsequent period of time. Such display may occur at the wellsite or at a remote location in real-time or at a subsequent period of time.

Figure 4:
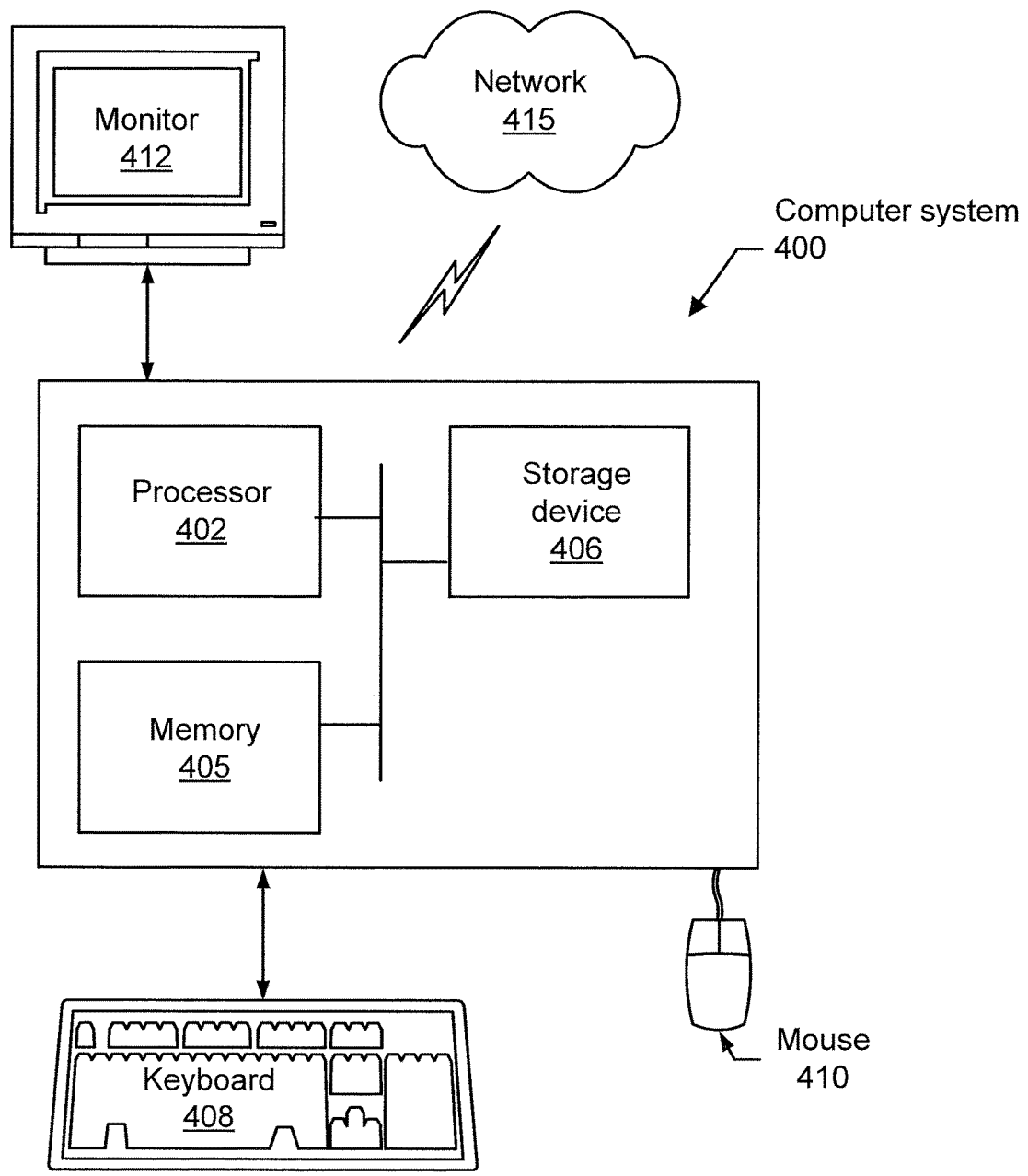
FIG. 4 shows a computer system with which one or more embodiments of pixel-based inversion may be implemented.

Embodiments of formation estimation may be implemented on virtually any type of computer regardless of the platform being used. For instance, as shown in FIG. 4, a computer system (400) includes one or more processor(s) (402) such as a central processing unit (CPU) or other hardware processor, associated memory (405) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display LCD, a plasma display, or cathode ray tube (CRT) monitor). The computer system (400) may be connected to a network (415) (e.g., a local area network (LAN), a wide area network (WAN) such as the Internet, or any other similar type of network) via a network interface connection (not shown). Those skilled in the art will appreciate that many different types of computer systems exist (e.g., workstation, desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (400) includes at least the minimal processing, input, and/or output means necessary to practice one or more embodiments.

Further, those skilled in the art will appreciate that one or more elements of the aforementioned computer system (400) may be located at a remote location and connected to the other elements over a network. Further, one or more embodiments may be implemented on a distributed system having a plurality of nodes, where each portion of the implementation may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. Moreover, embodiments disclosed herein may be practiced in the absence of any element which is not specifically disclosed.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of estimating a formation parameter in a borehole of a subterranean formation, the method comprising:
   (a) drilling the borehole in the subterranean formation using a drilling system including a logging while drilling (LWD) tool, the logging while drilling tool including a source and a receiver;
   (b) causing the source to generate a signal that propagates into the subterranean formation while drilling in (a);
   (c) causing the receiver to receive the signal generated in (b);
   (d) causing a processor to run a forward model on a non-uniform forward modeling grid to compute a simulated formation parameter;
   (e) causing the processor to estimate the formation parameter on a uniform inversion grid, wherein near field and far field regions employ the same grid cell size, by applying a pixel-based inversion algorithm to the signal received in (c) and the simulated formation parameter computed in (d); and
   (f) displaying the formation parameter estimated in (e) as a spatial distribution of a survey area.

2. The method of claim 1, further comprising selecting a resolution of the uniform inversion grid to match a resolution measurement.

3. The method of claim 1, further comprising:
   interpolating, using an interpolation scheme, to map a field distribution from the non-uniform forward modeling grid to the uniform inversion grid.

4. The method of claim 1, wherein the non-uniform forward modeling grid comprises a fine spatial discretization at a near-field distance with respect to the LWD tool and a coarse spatial discretization at a far-field distance with respect to the LWD tool.

5. The method of claim 1, wherein the source is an electromagnetic source.

6. The method of claim 1, wherein the uniform inversion grid comprises a plurality of sub-domains having a first and a second sub-domain.

7. The method of claim 6, wherein:
   the processor estimates the formation parameter in (e) by estimating the formation parameter for each of the plurality of sub-domains and merging them together.

8. The method of claim 7, wherein the formation parameter for the first sub-domain and the formation parameter for the second sub-domain are estimated independently of each other.

9. The method of claim 7, wherein the formation parameter for the first sub-domain and the formation parameter for the second sub-domain are estimated in parallel with each other.

10. The method of claim 7, wherein the first and second sub-domain overlap one another.

11. A system for estimating a formation parameter, the system comprising:
    a logging while drilling (LWD) tool having an electromagnetic source and an electromagnetic receiver; and
    a processor, the processor configured to (i) acquire LWD measurements from the LWD tool, (ii) run a forward model on a non-uniform forward modeling grid to compute a simulated formation parameter, (iii) estimate a formation parameter on a uniform inversion grid, wherein near field and far field regions employ the same grid cell size, by applying a pixel-based inversion algorithm to the acquired LWD measurements and the simulated formation parameter.

12. The system of claim 11, wherein a resolution of the uniform inversion grid is chosen to match a resolution measurement.

13. The system of claim 11, wherein the processor is further configured to (iv) map a field distribution from the non-uniform forward modeling grid to the uniform inversion grid via interpolation.

14. The system of claim 11, wherein the non-uniform forward modeling grid comprises a fine spatial discretization at a near-field distance with respect to the LWD tool and a coarse spatial discretization at a far-field distance with respect to the LWD tool.

15. The system of claim 11, wherein the uniform inversion grid comprises a plurality of sub-domains having a first and a second sub-domain.

16. The system of claim 15, wherein the processor is configured to estimate the formation parameter in (iii) by estimating the formation parameter for each of the plurality of sub-domains and merging them together.

17. The system of claim 16, wherein the formation parameter for the first sub-domain and the formation parameter for the second sub-domain are generated independently of each other.

18. The system of claim 16, wherein the formation parameter for the first sub-domain and the formation parameter for the second sub-domain are generated in parallel with each other.

19. The method of claim 1, further comprising:
    (g) adjusting a direction of a trajectory of drilling the borehole in (a) in response to the formation parameter estimated in (e) and displayed in (f).

* * * * *